United States Patent
Bronczyk et al.

(10) Patent No.: US 9,147,916 B2
(45) Date of Patent: Sep. 29, 2015

(54) BATTERY CELL ASSEMBLIES

(75) Inventors: Steven A. Bronczyk, Rochester Hills, MI (US); Kwok Tom, Madison Heights, MI (US); William Koetting, Davisburg, MI (US)

(73) Assignee: LG Chem, Ltd., Seoul (KR)

( * ) Notice: Subject to any disclaimer, the term of this patent is extended or adjusted under 35 U.S.C. 154(b) by 922 days.

(21) Appl. No.: 12/857,908

(22) Filed: Aug. 17, 2010

(65) Prior Publication Data

US 2011/0256446 A1 Oct. 20, 2011

Related U.S. Application Data

(60) Provisional application No. 61/325,290, filed on Apr. 17, 2010.

(51) Int. Cl.
*H01M 2/00* (2006.01)
*A47B 96/00* (2006.01)
(Continued)

(52) U.S. Cl.
CPC ........ *H01M 10/5032* (2013.01); *H01M 2/1061* (2013.01); *H01M 2/1077* (2013.01); *H01M 10/5004* (2013.01); *H01M 10/613* (2015.04); *H01M 10/647* (2015.04)

(58) Field of Classification Search
CPC ............... H01M 10/5004; H01M 10/5032; H01M 2/1061; H01M 2/1077; H01M 2/0212; H01M 10/0413; H01M 2/021; H01M 2/0287; H01M 10/052; H01M 10/5016; H01M 10/5046; H01M 2/08; H01M 2/18; H01M 2/206; H01M 10/04; H01M 10/0525; H01M 10/0565; H01M 10/46; H01M 10/48; H01M 10/486; H01M 10/5055; H01M 10/5059; H01M 10/5061; H01M 10/5063; H01M 10/5067; H01M 10/5073; H01M 12/065; H01M 2004/024; H01M 2/0207; H01M 2/0217; H01M 2/0267; H01M 2/0275; H01M 2/0408; H01M 2/06; H01M 2/1072; H01M 2/20; H01M 2/202; H01M 2/24; H01M 2/266; H01M 2/305; H01M 4/8626; Y10T 29/49108; Y10T 29/49114; Y02T 10/7011; Y02E 60/12; Y02E 60/50
USPC ......... 429/120, 151, 152, 153, 154, 155, 158, 429/159; 211/26
See application file for complete search history.

(56) References Cited

U.S. PATENT DOCUMENTS 2,273,244 A 2/1942 Ambruster
3,503,558 A 3/1970 Galiulo et al.
(Continued)

FOREIGN PATENT DOCUMENTS

CN 1512518 A 7/2004
EP 0736226 B1 3/1999
(Continued)

OTHER PUBLICATIONS

Chinese Office Action dated Dec. 7, 2007 for Chinese Patent Application No. 200480025941.5 (PCT/KR2004/002399).
(Continued)

*Primary Examiner* — Carlos Barcena
(74) *Attorney, Agent, or Firm* — Buckert Patent & Trademark Law Firm, PC; John F. Buckert

(57) ABSTRACT

A battery cell assembly in accordance with an exemplary embodiment is provided. The assembly includes a first frame member having a first plurality of tabs extending away from a first peripheral edge of the first frame member. Each tab of the first plurality of tabs has a first coupling feature at a distal end of the respective tab. The assembly further includes a second frame member having a plurality of slots extending into a second peripheral edge of the second frame member. The assembly further includes a battery cell disposed between the first and second frame members, and each first coupling feature of each tab of the first plurality of tabs is configured to engage a respective slot of the plurality of slots of the second frame member to fixedly hold the first and second frame members together.

10 Claims, 15 Drawing Sheets

(51) Int. Cl.
 *H01M 10/647* (2014.01)
 *H01M 2/10* (2006.01)
 *H01M 10/613* (2014.01)

(56) References Cited

U.S. PATENT DOCUMENTS

| | | | |
|---|---|---|---|
| 3,522,100 A | 7/1970 | Lindstrom | |
| 4,390,841 A | 6/1983 | Martin et al. | |
| 4,396,689 A | 8/1983 | Grimes et al. | |
| 4,950,561 A | 8/1990 | Niksa et al. | |
| 5,071,652 A | 12/1991 | Jones et al. | |
| 5,270,131 A | 12/1993 | Diethelm et al. | |
| 5,346,786 A | 9/1994 | Hodgetts | |
| 5,354,630 A | 10/1994 | Earl et al. | |
| 5,364,711 A | 11/1994 | Yamada et al. | |
| 5,385,793 A | 1/1995 | Tiedemann et al. | |
| 5,480,743 A * | 1/1996 | McCarter et al. | 429/96 |
| 5,487,955 A | 1/1996 | Korall et al. | |
| 5,487,958 A | 1/1996 | Tura | |
| 5,510,203 A | 4/1996 | Hamada et al. | |
| 5,520,976 A | 5/1996 | Giannetti et al. | |
| 5,561,005 A | 10/1996 | Omaru et al. | |
| 5,589,290 A | 12/1996 | Klink et al. | |
| 5,606,242 A | 2/1997 | Hull et al. | |
| 5,652,502 A | 7/1997 | van Phuc et al. | |
| 5,658,682 A | 8/1997 | Usuda et al. | |
| 5,663,007 A | 9/1997 | Ikoma et al. | |
| 5,693,432 A | 12/1997 | Matsumoto | |
| 5,756,227 A | 5/1998 | Suzuki et al. | |
| 5,796,239 A | 8/1998 | van Phuoc et al. | |
| 5,825,155 A | 10/1998 | Ito et al. | |
| 5,982,403 A | 11/1999 | Inagaki | |
| 6,016,047 A | 1/2000 | Notten et al. | |
| 6,099,986 A | 8/2000 | Gauthier et al. | |
| 6,117,584 A | 9/2000 | Hoffman et al. | |
| 6,121,752 A | 9/2000 | Kitihara et al. | |
| 6,257,328 B1 | 7/2001 | Fujiwara et al. | |
| 6,353,815 B1 | 3/2002 | Vilim et al. | |
| 6,362,598 B2 | 3/2002 | Laig-Horstebrock et al. | |
| 6,406,812 B1 | 6/2002 | Dreulle et al. | |
| 6,413,678 B1 | 7/2002 | Hamamoto et al. | |
| 6,422,027 B1 | 7/2002 | Coates, Jr. et al. | |
| 6,441,586 B1 | 8/2002 | Tate, Jr. et al. | |
| 6,448,741 B1 | 9/2002 | Inui et al. | |
| 6,462,949 B1 | 10/2002 | Parish, IV et al. | |
| 6,475,659 B1 | 11/2002 | Heimer | |
| 6,515,454 B2 | 2/2003 | Schoch | |
| 6,534,954 B1 | 3/2003 | Plett | |
| 6,563,318 B2 | 5/2003 | Kawakami et al. | |
| 6,709,783 B2 | 3/2004 | Ogata et al. | |
| 6,724,172 B2 | 4/2004 | Koo | |
| 6,771,502 B2 | 8/2004 | Getz, Jr. et al. | |
| 6,780,538 B2 | 8/2004 | Hamada et al. | |
| 6,821,671 B2 | 11/2004 | Hinton et al. | |
| 6,829,562 B2 | 12/2004 | Sarfert | |
| 6,832,171 B2 | 12/2004 | Barsoukov et al. | |
| 6,876,175 B2 | 4/2005 | Schoch | |
| 6,886,249 B2 | 5/2005 | Smalc | |
| 6,892,148 B2 | 5/2005 | Barsoukov et al. | |
| 6,927,554 B2 | 8/2005 | Tate, Jr. et al. | |
| 6,943,528 B2 | 9/2005 | Schoch | |
| 6,967,466 B2 | 11/2005 | Koch | |
| 6,982,131 B1 | 1/2006 | Hamada et al. | |
| 7,012,434 B2 | 3/2006 | Koch | |
| 7,026,073 B2 | 4/2006 | Ueda et al. | |
| 7,039,534 B1 | 5/2006 | Ryno et al. | |
| 7,061,246 B2 | 6/2006 | Dougherty et al. | |
| 7,072,871 B1 | 7/2006 | Tinnemeyer | |
| 7,098,665 B2 | 8/2006 | Laig-Hoerstebrock | |
| 7,109,685 B2 | 9/2006 | Tate, Jr. et al. | |
| 7,126,312 B2 | 10/2006 | Moore | |
| 7,147,045 B2 | 12/2006 | Quisenberry et al. | |
| 7,197,487 B2 | 3/2007 | Hansen et al. | |
| 7,199,557 B2 | 4/2007 | Anbuky et al. | |
| 7,229,327 B2 | 6/2007 | Zhao et al. | |
| 7,241,530 B2 * | 7/2007 | Oogami | 429/159 |
| 7,250,741 B2 | 7/2007 | Koo et al. | |
| 7,251,889 B2 | 8/2007 | Kroliczek et al. | |
| 7,253,587 B2 | 8/2007 | Meissner | |
| 7,264,902 B2 | 9/2007 | Horie et al. | |
| 7,315,789 B2 | 1/2008 | Plett | |
| 7,321,220 B2 | 1/2008 | Plett | |
| 7,327,147 B2 | 2/2008 | Koch | |
| 7,400,115 B2 | 7/2008 | Plett | |
| 7,446,504 B2 | 11/2008 | Plett | |
| 7,479,758 B2 | 1/2009 | Moon | |
| 7,518,339 B2 | 4/2009 | Schoch | |
| 7,521,895 B2 | 4/2009 | Plett | |
| 7,525,285 B2 | 4/2009 | Plett | |
| 7,583,059 B2 | 9/2009 | Cho | |
| 7,589,532 B2 | 9/2009 | Plett | |
| 7,776,466 B2 * | 8/2010 | Oh | 429/153 |
| 7,829,216 B2 | 11/2010 | Han et al. | |
| 7,883,793 B2 * | 2/2011 | Niedzwiecki et al. | 429/120 |
| 7,976,980 B2 | 7/2011 | Yoon et al. | |
| 8,067,111 B2 * | 11/2011 | Koetting et al. | 429/120 |
| 8,163,412 B2 * | 4/2012 | Koetting et al. | 429/90 |
| 8,202,645 B2 | 6/2012 | Young | |
| 8,309,248 B2 | 11/2012 | Koetting et al. | |
| 2001/0046624 A1 | 11/2001 | Goto et al. | |
| 2003/0082440 A1 | 5/2003 | Mrotek et al. | |
| 2003/0184307 A1 | 10/2003 | Kozlowski et al. | |
| 2004/0021442 A1 | 2/2004 | Higashino | |
| 2005/0026014 A1 | 2/2005 | Fogaing et al. | |
| 2005/0100786 A1 | 5/2005 | Ryu et al. | |
| 2005/0123828 A1 * | 6/2005 | Oogami et al. | 429/152 |
| 2005/0127874 A1 | 6/2005 | Lim et al. | |
| 2005/0134038 A1 | 6/2005 | Walsh | |
| 2006/0100833 A1 | 5/2006 | Plett | |
| 2006/0234119 A1 | 10/2006 | Kruger et al. | |
| 2006/0286450 A1 * | 12/2006 | Yoon et al. | 429/180 |
| 2007/0037051 A1 | 2/2007 | Kim et al. | |
| 2007/0072066 A1 | 3/2007 | Yoon et al. | |
| 2007/0087266 A1 | 4/2007 | Bourke et al. | |
| 2007/0120533 A1 | 5/2007 | Plett | |
| 2007/0126396 A1 | 6/2007 | Yang | |
| 2007/0141457 A1 | 6/2007 | Amagai | |
| 2007/0207377 A1 | 9/2007 | Han et al. | |
| 2008/0094035 A1 | 4/2008 | Plett | |
| 2009/0029239 A1 | 1/2009 | Koetting et al. | |
| 2009/0186265 A1 * | 7/2009 | Koetting et al. | 429/120 |
| 2009/0325051 A1 | 12/2009 | Niedzwiecki et al. | |
| 2009/0325052 A1 | 12/2009 | Koetting et al. | |
| 2009/0325053 A1 | 12/2009 | Koetting et al. | |
| 2009/0325054 A1 | 12/2009 | Payne et al. | |
| 2009/0325055 A1 | 12/2009 | Koetting et al. | |
| 2009/0325059 A1 | 12/2009 | Niedzwiecki et al. | |
| 2010/0086842 A1 * | 4/2010 | Yang | 429/163 |
| 2010/0266883 A1 | 10/2010 | Koetting et al. | |

FOREIGN PATENT DOCUMENTS

| | | |
|---|---|---|
| EP | 0673553 B1 | 2/2001 |
| EP | 1435675 A1 | 7/2004 |
| JP | 4056079 A | 2/1992 |
| JP | 8138735 A | 5/1996 |
| JP | 8222280 A | 8/1996 |
| JP | 9129213 A | 5/1997 |
| JP | 09-219213 | 8/1997 |
| JP | 10199510 A | 7/1998 |
| JP | 11066949 A | 3/1999 |
| JP | 11191432 A | 7/1999 |
| JP | 2003219572 A | 7/2003 |
| JP | 2003346745 A | 12/2003 |
| JP | 2003346749 A | 12/2003 |
| JP | 2004055456 A | 2/2004 |
| JP | 2005-126315 | 5/2005 |
| JP | 2005122927 A | 5/2005 |
| JP | 2005259379 A | 9/2005 |
| JP | 2005268004 | 9/2005 |
| JP | 2006155962 A | 6/2006 |
| JP | 2008-080995 | 4/2008 |
| JP | 2008103248 A | 5/2008 |
| JP | 2009224271 | 10/2009 |

(56) References Cited

FOREIGN PATENT DOCUMENTS

| | | |
|---|---|---|
| KR | 20070012809 A | 1/2007 |
| KR | 100765659 B1 | 10/2007 |
| KR | 100813812 B1 | 3/2008 |
| KR | 20080047641 A | 5/2008 |
| KR | 100889241 B1 | 3/2009 |
| KR | 100904375 B1 | 6/2009 |
| KR | 100905393 B1 | 6/2009 |
| KR | 100921346 B1 | 10/2009 |
| KR | 20100039184 A | 4/2010 |
| WO | WO03/071616 A2 | 8/2003 |
| WO | 2006059455 A | 6/2006 |
| WO | 2006093010 A | 9/2006 |
| WO | 2006101342 A | 9/2006 |
| WO | 2009061451 A1 | 5/2009 |
| WO | 2009103527 A | 8/2009 |

OTHER PUBLICATIONS

European Supplementary Search Report dated Aug. 28, 2009 for EP Application No. 04774658.

International Search Report for International application No. PCT/KR2005/003755 dated Mar. 2, 2006.

International Search Report for PCT/KR2009/000258 dated Aug. 28, 2009.

International Search report for PCT/KR2009/003434 dated Jan. 18, 2010.

Machine translation of JP 08-138735, May 31, 1996.

Machine translation of JP 10-199510, Jul. 31, 1998.

U.S. Appl. No. 12/426,795, filed Apr. 20, 2009 entitled Frame Member, Frame Assembly and Battery Cell Assembly Made Therefrom and Methods of Making the Same.

U.S. Appl. No. 12/433,155, filed Apr. 30, 2009 entitled Cooling System for a Battery System and a Method for Cooling the Battery System.

U.S. Appl. No. 12/433,397, filed Apr. 30, 2009 entitled Battery Systems, Battery Modules, and Method for Cooling a Battery Module.

U.S. Appl. No. 12/433,427, filed Apr. 30, 2009 entitled Cooling Manifold and Method for Manufacturing the Cooling Manifold.

U.S. Appl. No. 12/433,485, filed Apr. 30, 2009 entitled Battery Systems, Battery Module, and Method for Cooling the Battery Module.

U.S. Appl. No. 12/433,534, filed Apr. 30, 2009 entitled Battery Systems, Battery Modules, and Method for Cooling a Battery Module.

U.S. Appl. No. 12/511,530, filed Jul. 29, 2009 entitled Battery Module and Method for Cooling the Battery Module.

U.S. Appl. No. 12/511,552, filed Jul. 29, 2009 entitled Battery Module and Method for Cooling the Battery Module.

U.S. Appl. No. 12/549,766, filed Aug. 28, 2009 entitled Battery Module and Method for Cooling the Battery Module.

U.S. Appl. No. 12/794,949, filed Jun. 7, 2010 entitled Battery Module and Methods for Bonding a Cell Terminal of a Battery to an Interconnect Member.

U.S. Appl. No. 12/861,364, filed Aug. 23, 2010 entitled Connecting Assembly.

U.S. Appl. No. 12/861,375, filed Aug. 23, 2010 entitled attery System and Manifold Assembly Having a Manifold Member and a Connecting Fitting.

U.S. Appl. No. 12/861,381, filed Aug. 23, 2010 entitled End Cap.

U.S. Appl. No. 12/861,394, filed Aug. 23, 2010 entitled Battery System and Manifold Assembly With Two Manifold Members Removably Coupled Together.

U.S. Appl. No. 12/868,111, filed Aug. 25, 2010 entitled Battery Module and Methods for Bonding Cell Terminals of Battery Cells Together.

International Search Report for International Patent Application PCT/KR2010/002333 dated Nov. 17, 2010.

\* cited by examiner

BATTERY CELL ASSEMBLIES

CROSS-REFERENCE TO RELATED APPLICATIONS

This application claims priority to U.S. Provisional Patent Application No. 61/325,290, the entire contents of which are hereby incorporated by reference herein.

BACKGROUND

This application relates generally to battery cell assemblies, and more particularly to a battery cell assemblies having frame members with retaining tabs.

SUMMARY

A battery cell assembly in accordance with an exemplary embodiment is provided. The assembly includes a first frame member having a first plurality of tabs extending away from a first peripheral edge of the first frame member. Each tab of the first plurality of tabs has a first coupling feature at a distal end of the respective tab. The assembly further includes a second frame member having a plurality of slots extending into a second peripheral edge of the second frame member. The assembly further includes a battery cell disposed between the first and second frame members, and each first coupling feature of each tab of the first plurality of tabs is configured to engage a respective slot of the plurality of slots of the second frame member to fixedly hold the first and second frame members together.

A frame member in accordance with another exemplary embodiment is provided. The frame member includes a rectangular ring-shaped portion having a plurality of tabs extending away from a peripheral edge of the rectangular ring-shaped portion. Each tab of the plurality of tabs has a coupling feature at a distal end of the respective tab. The rectangular ring-shaped portion further includes a plurality of slots extending into a peripheral edge of the rectangular ring-shaped portion. Each slot of the plurality of slots is proximate to a respective tab of the plurality of tabs.

A battery cell assembly in accordance with another exemplary embodiment is provided. The assembly includes a first frame member having a first plurality of tabs extending away from a first peripheral edge of the first frame member in a first direction. Each tab of the first plurality of tabs has an aperture extending therethrough. The first frame member further includes a first plurality of coupling members extending from an inner region of the first frame member and having distal ends proximate to the first peripheral edge. Each coupling member of the first plurality coupling members extends generally perpendicular to a respective tab of the first plurality of tabs that is disposed proximate to the respective coupling member. The assembly further includes a second frame member having a second plurality of tabs extending away from a second peripheral edge of the second frame member in the first direction. Each tab of the second plurality of tabs has an aperture extending therethrough. The assembly further includes a battery cell disposed between the first and second frame members, and each tab of the second plurality of tabs of the second frame member is configured to engage a respective coupling member of the first plurality of coupling members to fixedly hold the first and second frame members together.

A frame member in accordance with another exemplary embodiment is provided. The frame member includes a rectangular ring-shaped portion having a plurality of tabs extending away from a peripheral edge of the rectangular ring-shaped portion in a first direction. Each tab of the plurality of tabs has an aperture extending therethrough. The rectangular ring-shaped portion further includes a plurality of coupling members extending from an inner region of the rectangular ring-shaped portion and having distal ends proximate to the peripheral edge. Each coupling member of the plurality coupling members extend generally perpendicular to a respective tab of the plurality of tabs that is disposed proximate to the respective coupling member.

These and other advantages and features will become more apparent from the following description taken in conjunction with the drawings.

DETAILED DESCRIPTION

Figure 1:
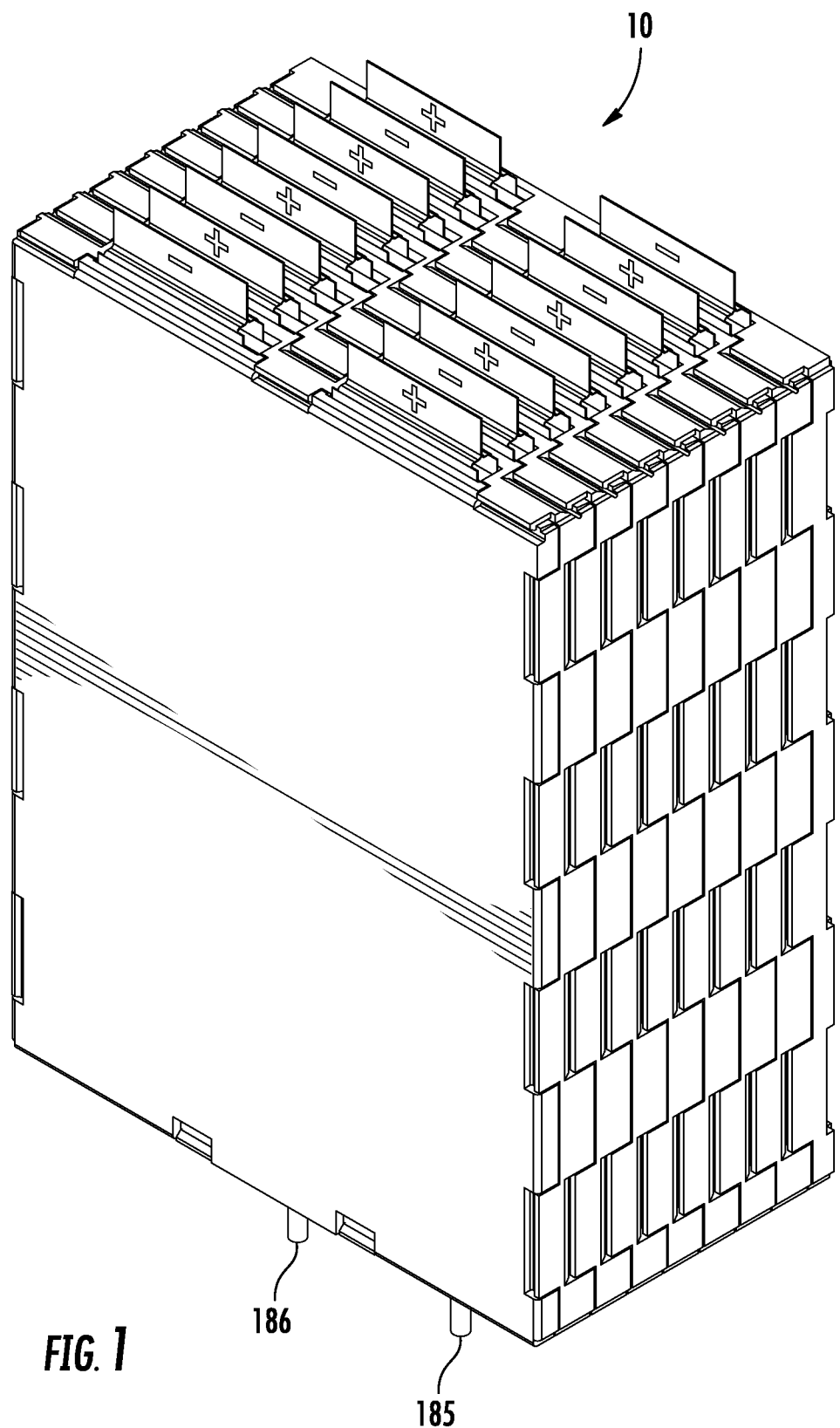
FIG. 1 is an isometric view of a battery module in accordance with an exemplary embodiment.

Referring to FIG. 1, a battery module 10 in accordance with an exemplary embodiment is illustrated. The battery module 10 is configured to provide electrical power to either a primary drive train of the vehicle or an auxiliary drive train of a vehicle. For purposes of discussion, only a portion of the battery module 10 will be described in greater detail below. In particular, referring to FIG. 2, the battery module 10 includes in part, a battery cell assembly 18 and a battery cell assembly 20.

Referring to FIGS. 1-9, the battery cell assembly 18 includes frame members 22, 24, battery cells 26, 28, and a cooling manifold or fin 30. The battery cell assembly 20 includes frame members 24, 32, battery cells 34, 36 and a cooling manifold 38. For purposes of simplicity, only the battery cell assembly 18 will be discussed in further detail below.

The frame members 22, 24 are configured to be coupled together to hold the battery cells 26, 28 and the cooling fin 30 therebetween, as will be discussed in greater detail below.

Referring to FIGS. 3-8, the frame member 22 includes a rectangular ring-shaped portion or body 50 and tabs 52, 54, 56, 58, 60, 62, 64, 66, 68, 70, 72, 74, 76. The tabs 52-76 extend away from a peripheral edge 90 of the rectangular ring-shaped portion 50 in a first direction. In an alternative embodiment, the frame member 22 could have a greater number of tabs or a lesser number of tabs than those tabs shown. The rectangular ring-shaped portion 50 includes a plurality of slots 152, 154, 156, 158, 160, 162, 164, 166, 168, 170, 172, 174 extending into the peripheral edge 90 that are disposed proximate to the tabs 52, 54, 56, 58, 60, 62, 64, 66, 68, 70, 72, 74, 76, respectively. Further, the rectangular ring-shaped portion 50 has apertures 180, 182, 184 extending therethrough to allow an inlet fluid conduit 185 and an outlet fluid conduit 186 to be fluidly coupled to the cooling manifolds 30, 38. In one exemplary embodiment, the frame member 20 is constructed of plastic. Of course, in alternative embodiments, the frame member 22 could be constructed of other materials known to those skilled in the art.

Figure 8:
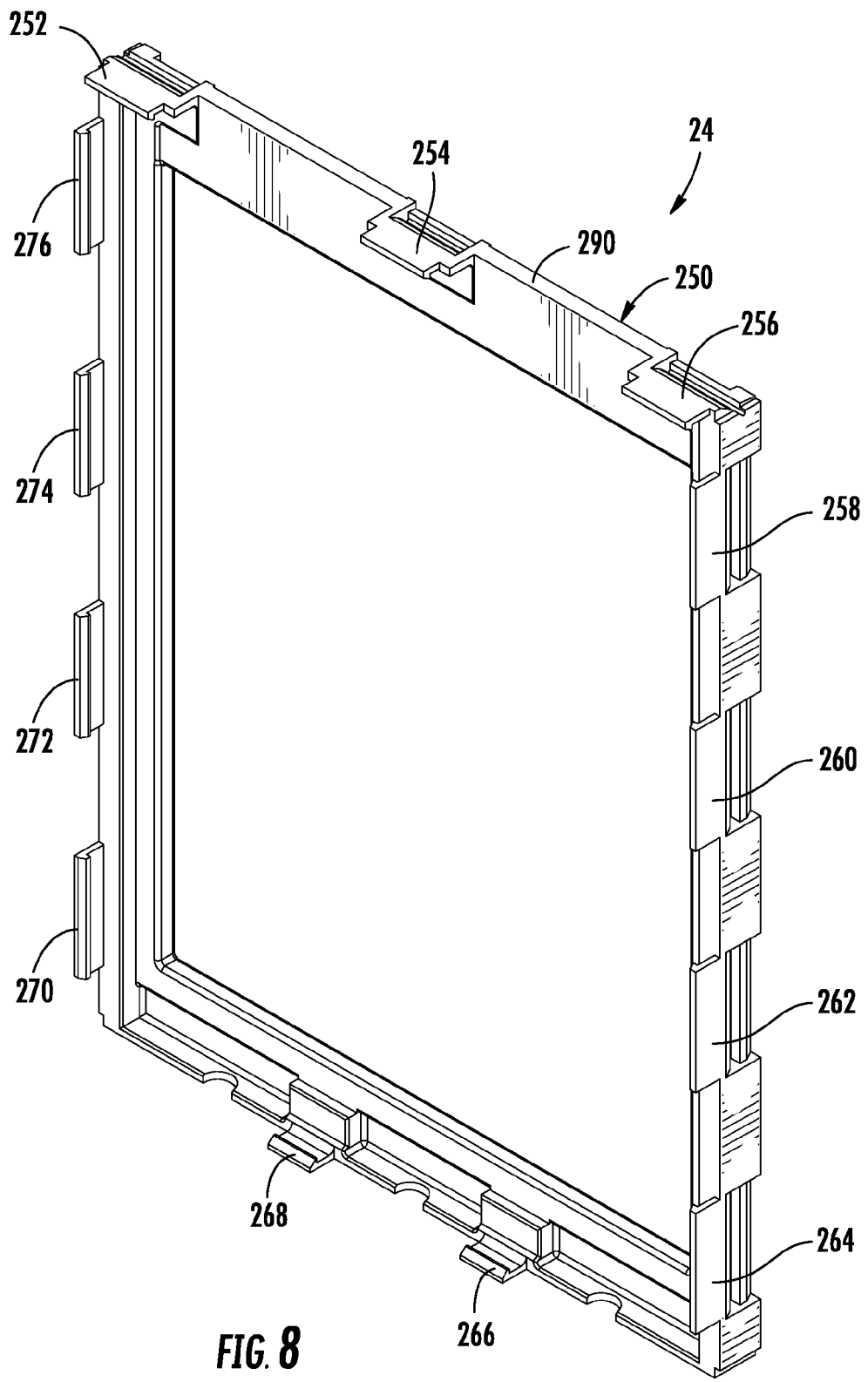
FIG. 8 is an isometric view of another frame member utilized in the battery module of FIG. 1.

Referring to FIG. 8, the frame member 24 has an identical structure as the frame member 22. Accordingly, only a portion of the components of the frame member 24 will be discussed below. In particular, the frame member 24 includes a rectangular ring-shaped portion or body 250 and tabs 252, 254, 256, 258, 260, 262, 264, 266, 268, 270, 272, 274, 276. The tabs 252-76 extend away from a peripheral edge 290 of the rectangular ring-shaped portion 250 in a first direction.

Figure 7:
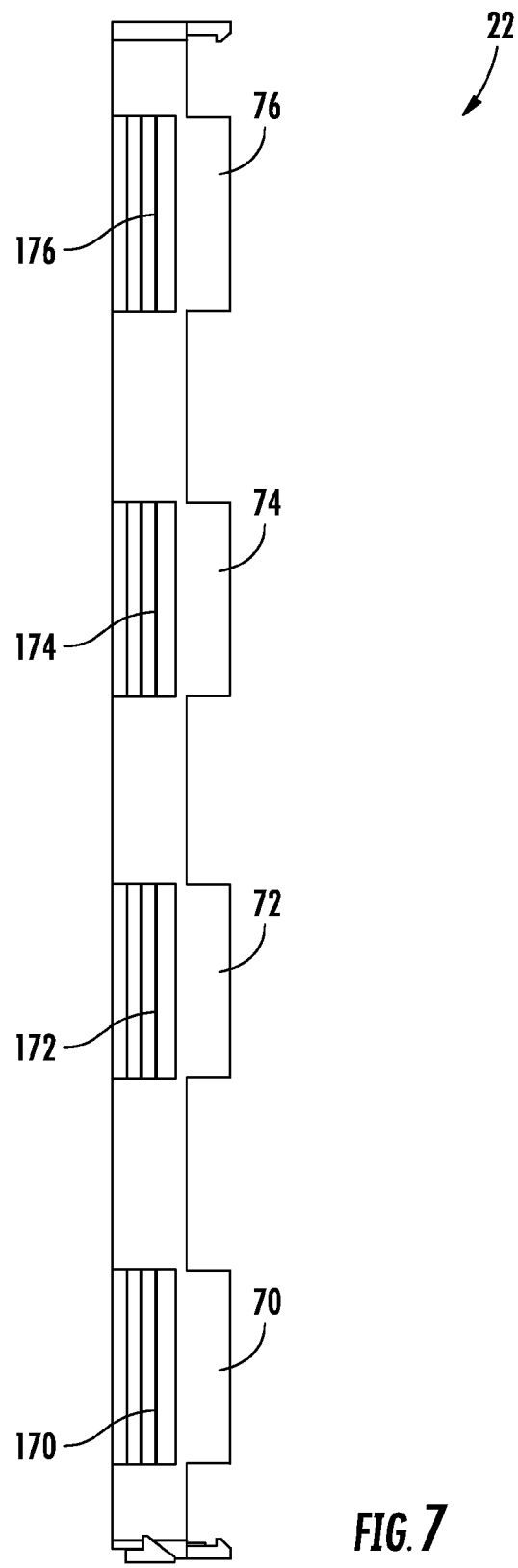
FIG. 7 is a side view of the frame member of FIG. 3.
Figure 9:
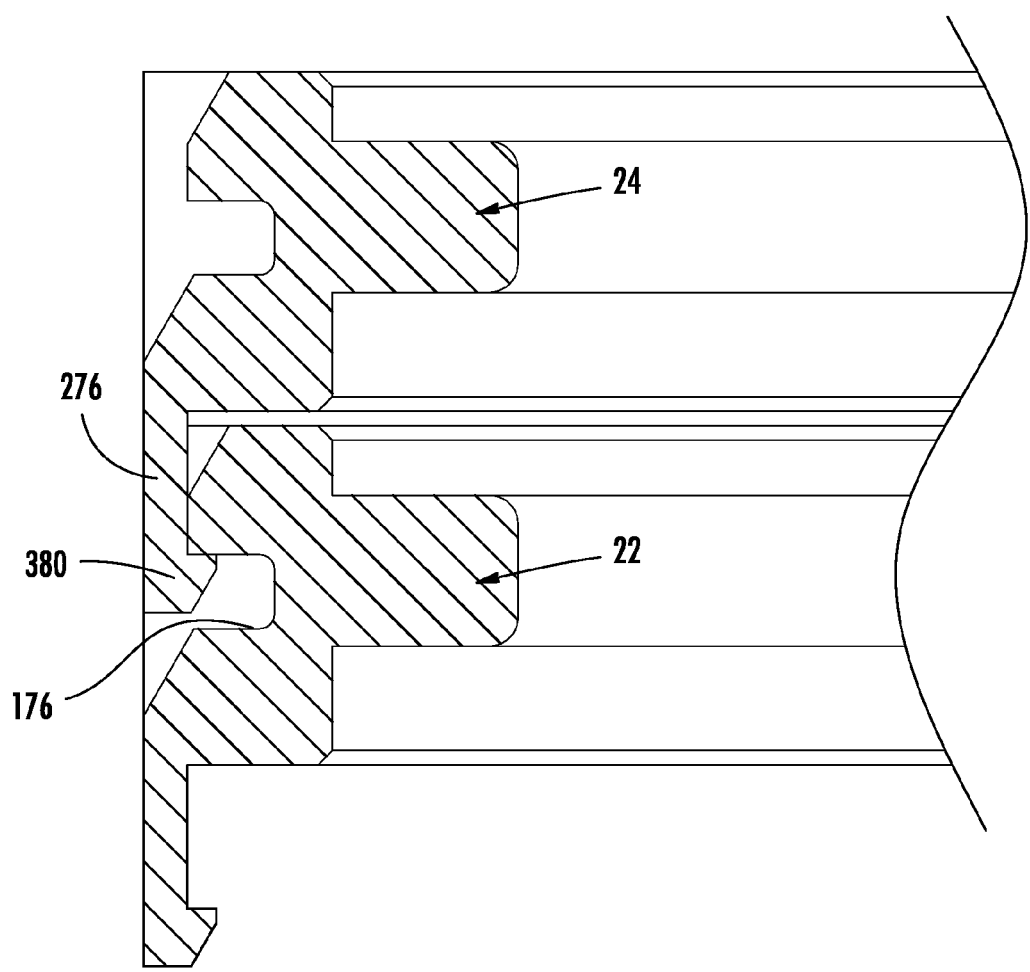
FIG. 9 is an enlarged cross-sectional view of a portion of the frame members of FIGS. 3 and 8, respectively, when the frame members are coupled together.

Referring to FIGS. 7-9, an explanation of how portions of the frame members 22, 24 are coupled together will be provided before explaining the coupling together of the frame members 22, 24 in their entirety. As shown, the frame member 24 has a tab 276 with a coupling feature 380 disposed of the distal end of the tab 276. The coupling feature 380 is configured to be received in a portion of the slot 176 in the frame member 22 to obtain a snap-fit engagement between the frame members 22, 24. It should be noted that each of the tabs in the frame members 24, 26 have a coupling feature similar to the coupling feature 380.

Figure 2:
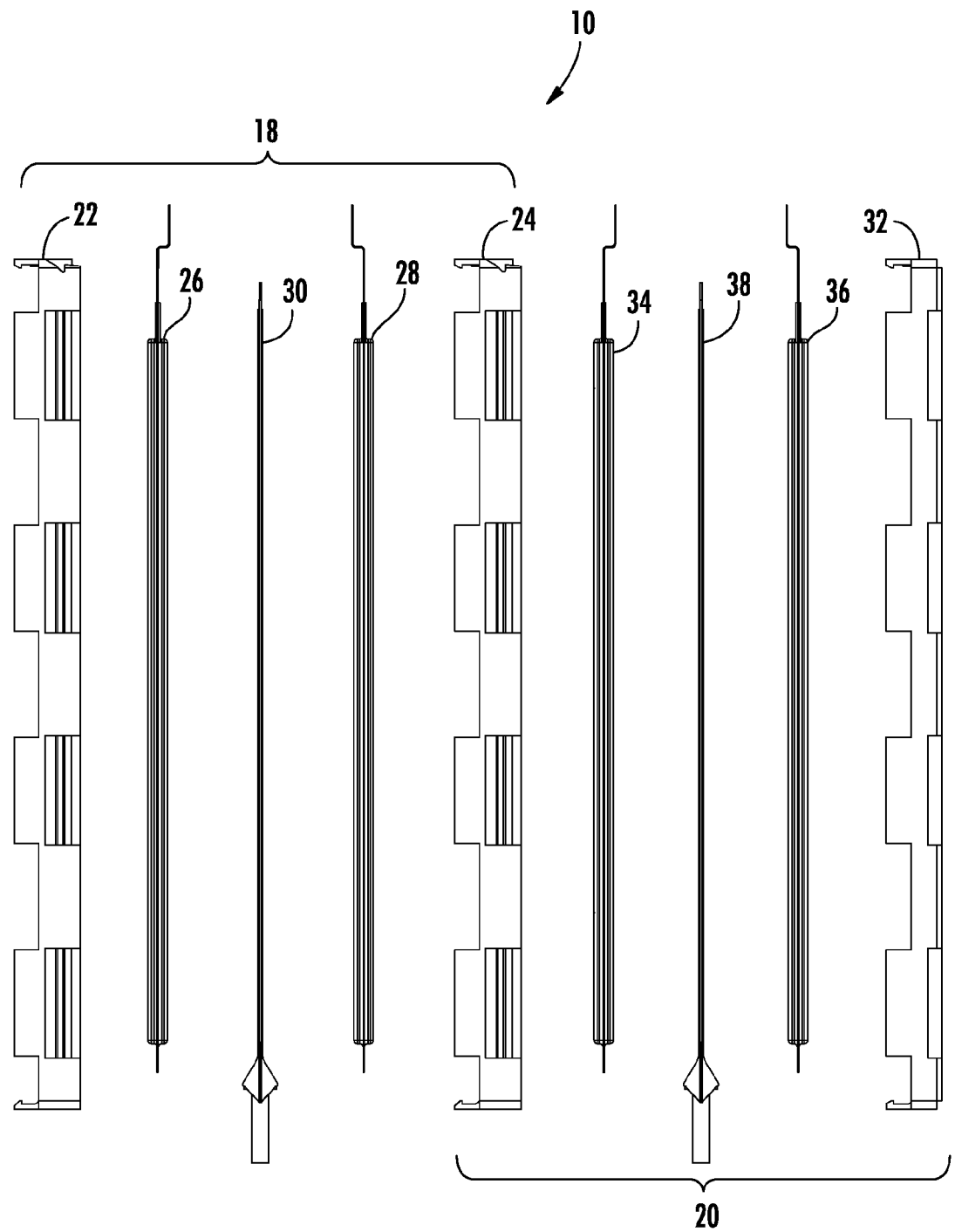
FIG. 2 is an exploded view of a portion of the battery module of FIG. 1.
Figure 3:
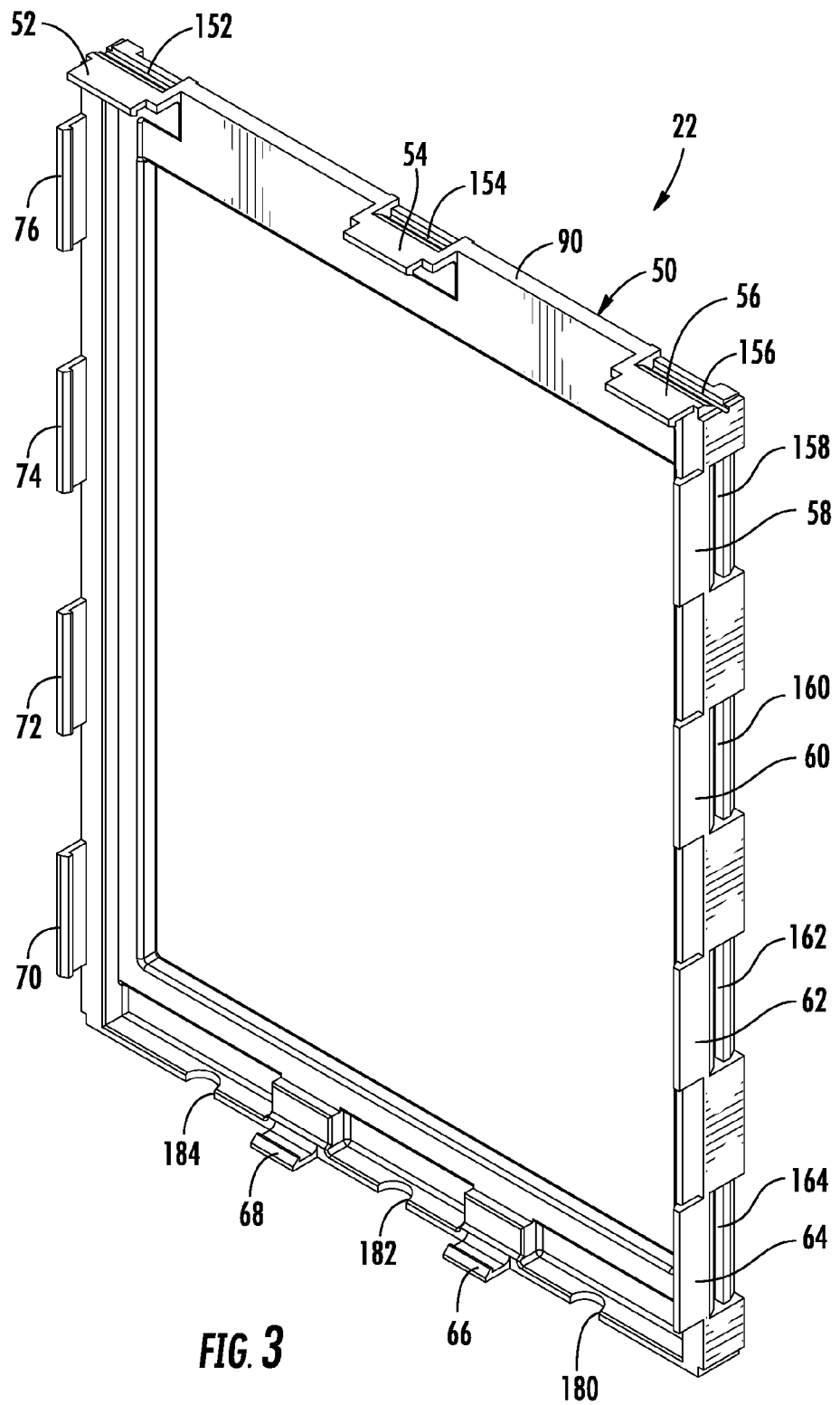
FIG. 3 is an isometric view of a frame member utilized in the battery module of FIG. 1.
Figure 4:
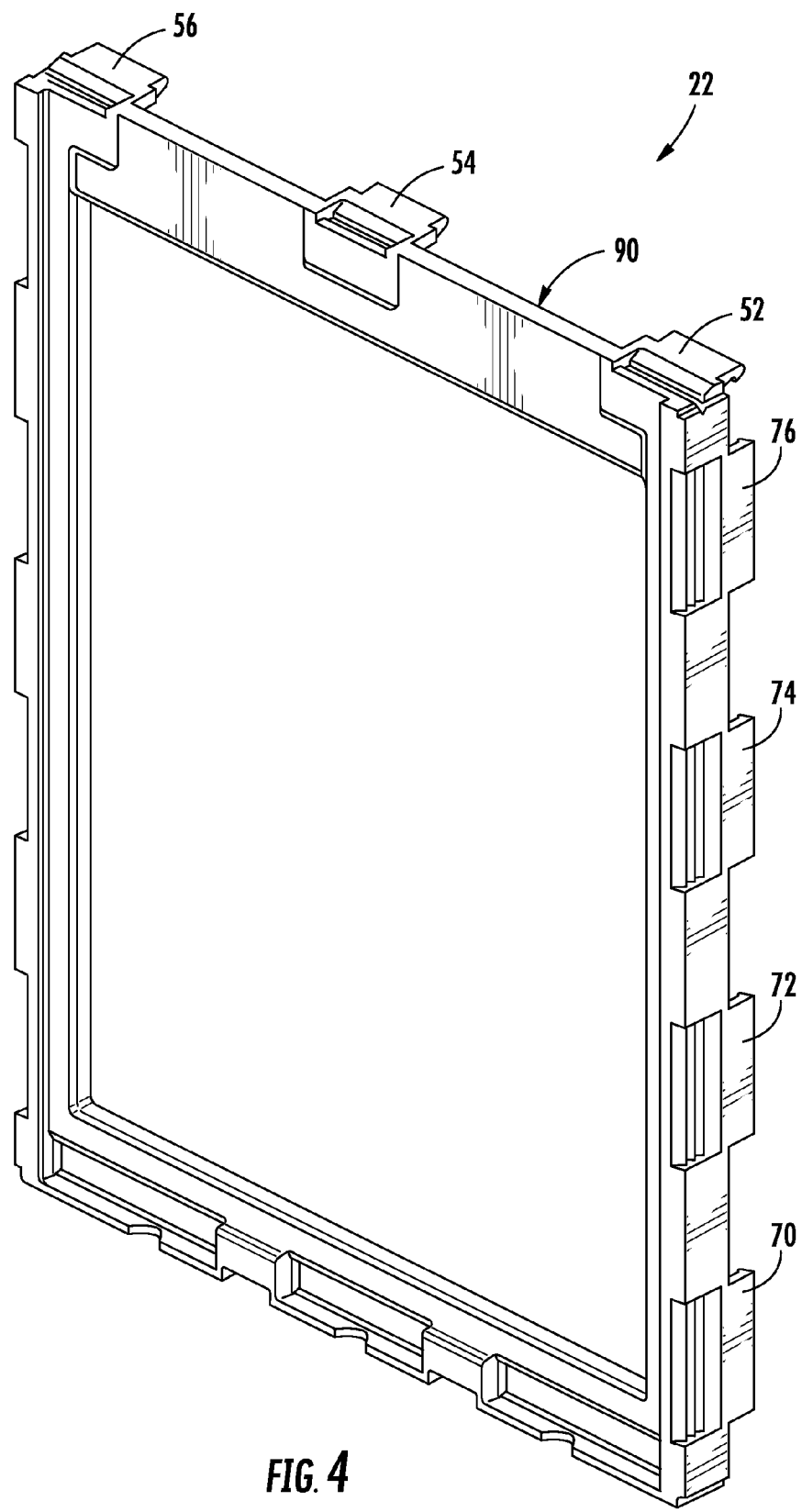
FIG. 4 is another isometric view of the frame member of FIG. 3.
Figure 5:
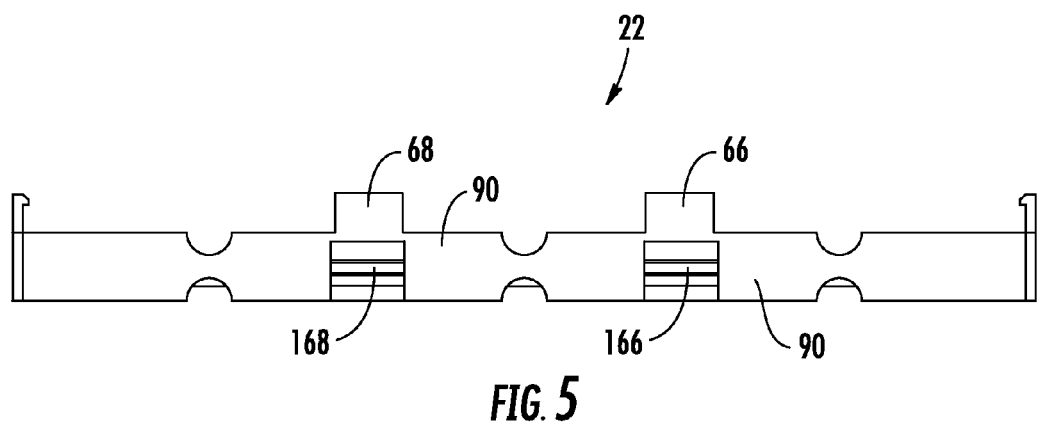
FIG. 5 is a bottom view of the frame member of FIG. 3.
Figure 6:
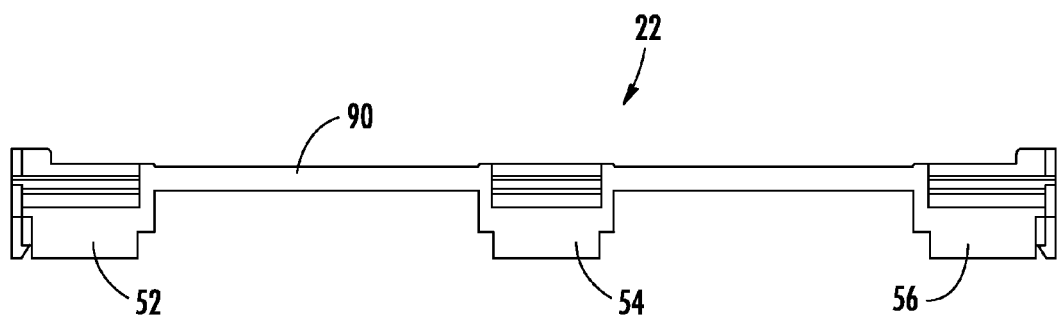
FIG. 6 is a top view of the frame member of FIG. 3.

Referring to FIGS. 2, 3 and 8, the battery cell assembly 18 is coupled together by disposing the battery cells 26, 28 and the cooling fin 30 between the frame members 22, 24, and then positioning the frame members 22, 24 adjacent to one another such that the coupling features of the tabs 252, 254, 256, 258, 260, 262, 264, 266, 268, 270, 272, 274, 276 of the frame member 24 engage the slots 152, 154, 156, 158, 160, 162, 164, 166, 168, 170, 172, 174, respectively, of the frame member 22 to fixedly hold the frame members 22, 24 together.

Referring to FIG. 1, in an exemplary embodiment the battery cells 26, 28 are lithium-ion pouch-type battery cells. Of course, other types of battery cells known to those skilled in the art could be utilized.

Referring to FIG. 2, the cooling fin 30 is configured to receive a coolant or fluid that flows through the manifold 30 to extract heat energy from the battery cells 26, 28. As shown, in one exemplary embodiment, the cooling fin 30 is disposed between the battery cells 26, 28.

Figure 10:
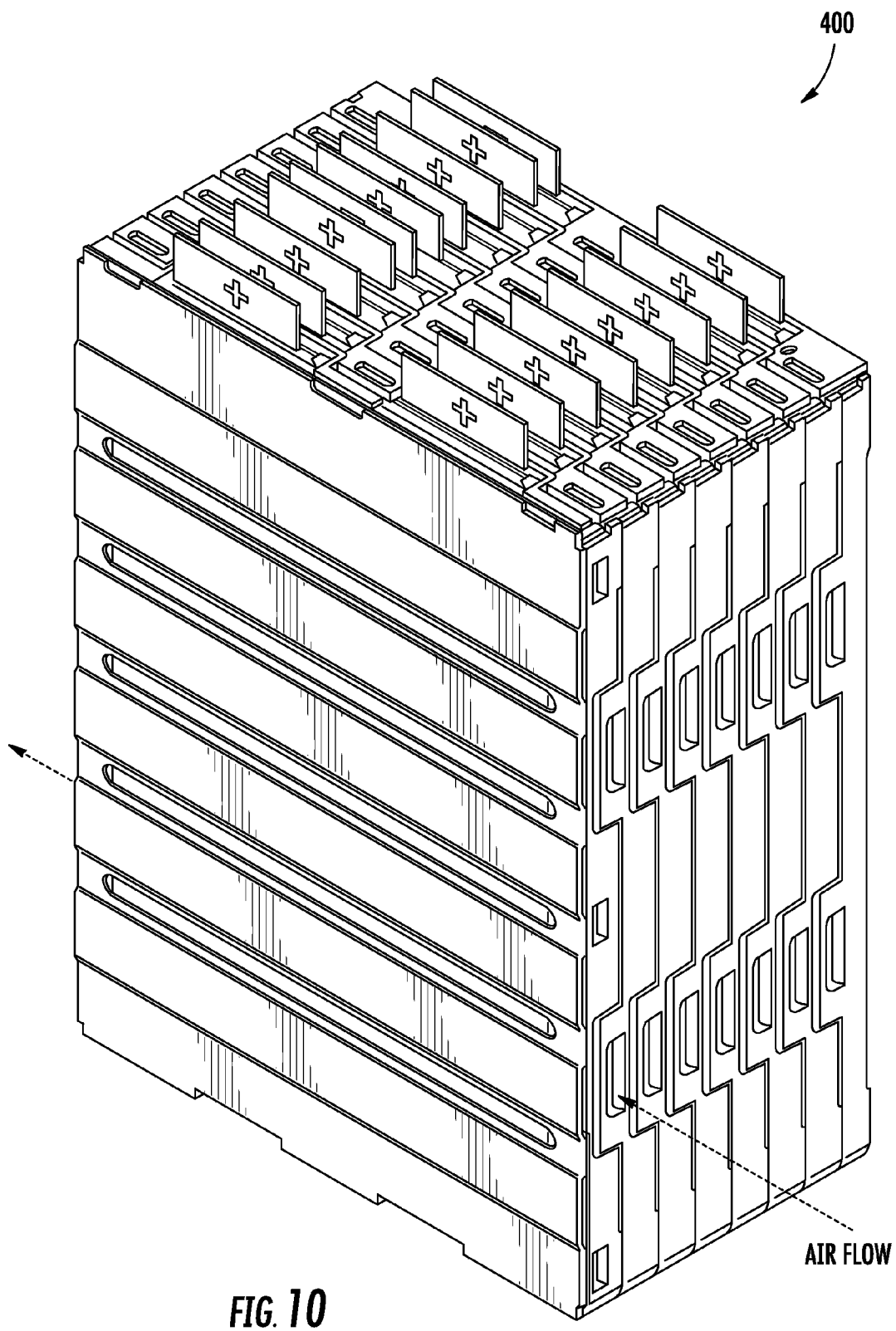
FIG. 10 is an isometric view of another battery module in accordance with another exemplary embodiment.

Referring to FIG. 10, a battery module 400 in accordance with another an exemplary embodiment is illustrated. The battery module 400 is configured to provide electrical power to either a primary drive train of the vehicle or an auxiliary drive train of a vehicle. For purposes of discussion, only a portion of the battery module 400 will be described in greater detail below. In particular, referring to FIG. 11, the battery module 400 includes in part, a battery cell assembly 410.

Referring to FIGS. 10-17, the battery cell assembly 410 includes frame members 422, 424, battery cells 426, 428, and a compressible spacer 430. An advantage of the battery cell assembly 410 is that the assembly 410 utilizes frame members having tabs with apertures extending therethrough wherein the tabs are utilized to couple adjacent frame members together and to allow air flow through the apertures to cool battery cells within the battery cell assembly 410.

The frame members 422, 424 are configured to be coupled together to hold the battery cells 426, 428 and the compressible spacer 430 therebetween, as will be discussed in greater detail below.

Referring to FIGS. 12-15, the frame member 422 includes a rectangular ring-shaped portion or body 429, tabs 452, 454, 456, 458, 460, 462, 464, 466, 468, 470, 472, cross-members 700, 702, 704, 706, 708 and a spacer portion 720. The tabs 452, 454, 456, 458, 460, 462, 464, 466, 468, 470, 472 include apertures 552, 554, 556, 558, 560, 562, 564, 568, 570, 572, respectively, extending therethrough. Further, the tabs 452-472 extend away from a peripheral edge 590 of the rectangular ring-shaped portion 429 in a first direction. The rectangular ring-shaped portion 429 includes coupling members 652, 654, 656, 658, 660, 662, 664, 668, 670, 672 extending from the inner region of the rectangular ring-shaped portion 429 that have distal ends proximate to the peripheral edge 5900. The coupling members 652-672 extend generally perpendicular to the tabs 452-472, respectively, that are disposed proximate to the coupling members 652-672, respectively.

In one exemplary embodiment, the rectangular ring-shaped portion 429 defines an open region 431. The cross-members 700, 702, 704, 706, 708 extend across the open region 431 that are coupled to opposite sides of the rectangular ring-shaped portion 429.

The spacing between the cross-members 700, 702 and the positioning of the tabs 458, 472 that allows air flow through a portion of the open region 431 will be explained. As shown, the tabs 458 and 472 are disposed on first and second sides, respectively, of the rectangular ring-shaped portion 429 and extend in the first direction. The tab 458 has leg portions 990, 992 extending parallel to one another and a bridging portion 994 disposed between the leg portions 990, 992 such that the aperture 558 is defined within the tab 458. The tab 472 has leg portions 1010, 1012 extending parallel to one another and a bridging portion 1014 disposed between the leg portions 1010, 1012 such that the aperture 572 is defined within the tab 472. The cross-members 700, 702 are disposed parallel to one another and apart from one another such that a gap is formed therebetween in the open region 431. A centerline 1024 extending through the cross-member 700 is co-planar with centerlines 996, 1016 extending through the leg portions 990, 1010, respectively. Further, a centerline 1026 extending through the cross-member 702 is co-planar with centerlines 998, 1018 extending through the leg portions 992, 1012, respectively, such that air flow occurs through the aperture 558 and through a gap between the cross-members 700, 702 and further through the aperture 572.

Figure 15:
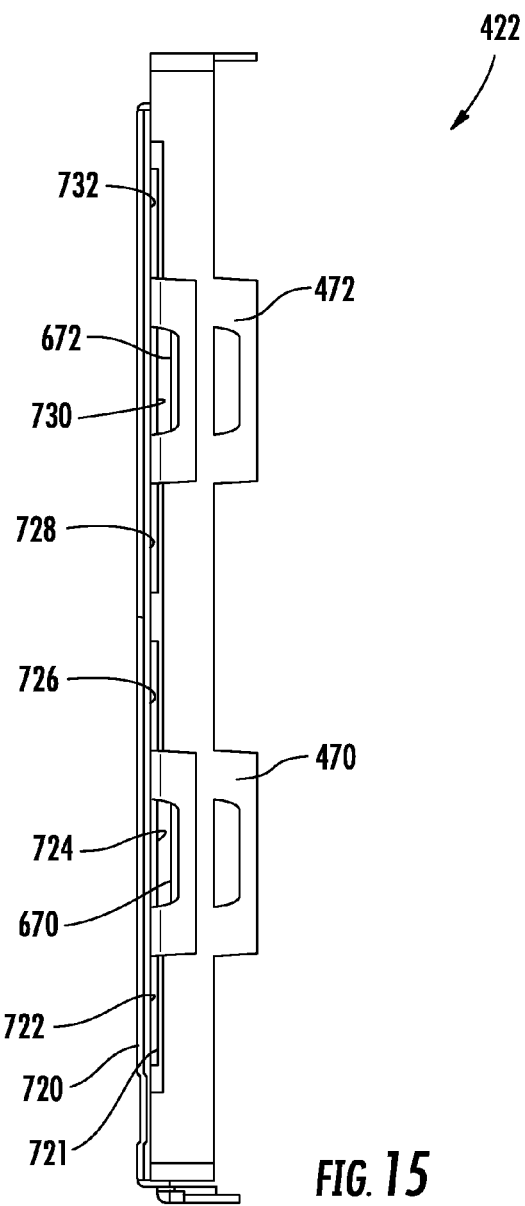
FIG. 15 is a side view of the frame member of FIG. 12.

Referring to FIG. 15, the spacer portion 720 extends away from a rear surface 721 of the frame member 422. The spacer portion 720 defines holes 722, 724, 726, 728, 730, 732 (and other holes not shown on an opposite side of the frame assembly 422) that allow the airflow therethrough into the open region 431 defined by the frame member 422 for cooling the battery cells 426, 428.

In one exemplary embodiment, the frame member 422 is constructed of plastic. Of course, in alternative embodiments, the frame member 422 could be constructed of other materials known to those skilled in the art.

Figure 12:
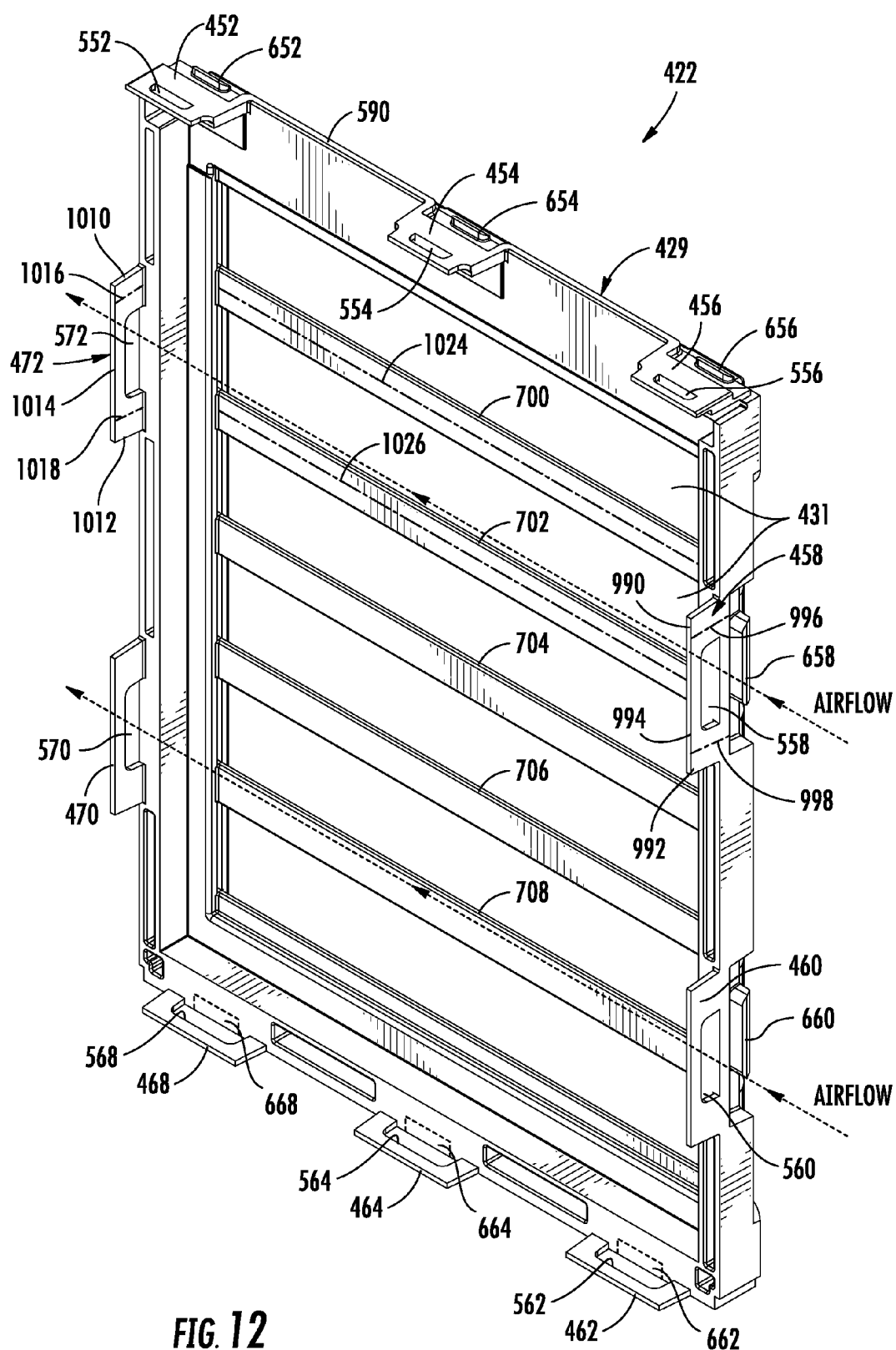
FIG. 12 is an isometric view of a frame member utilized in the battery module of FIG. 10.
Figure 13:
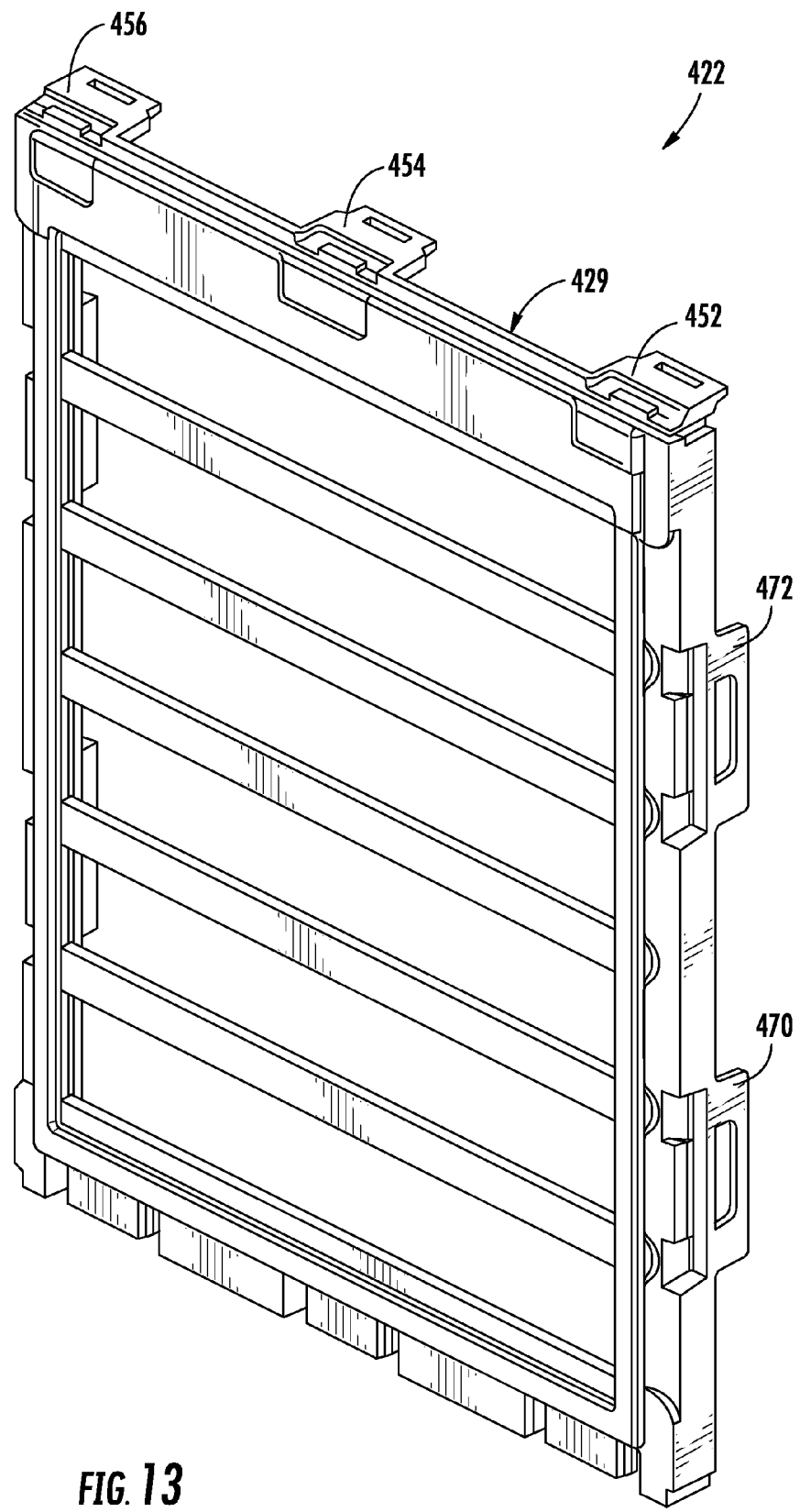
FIG. 13 is another isometric view of the frame member of FIG. 12.
Figure 14:
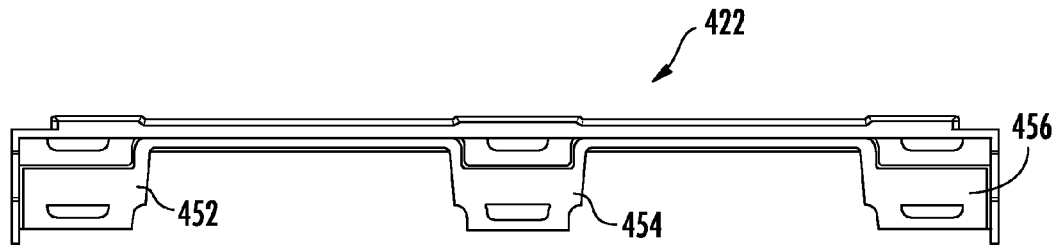
FIG. 14 is a top view of the frame member of FIG. 12.
Figure 16:
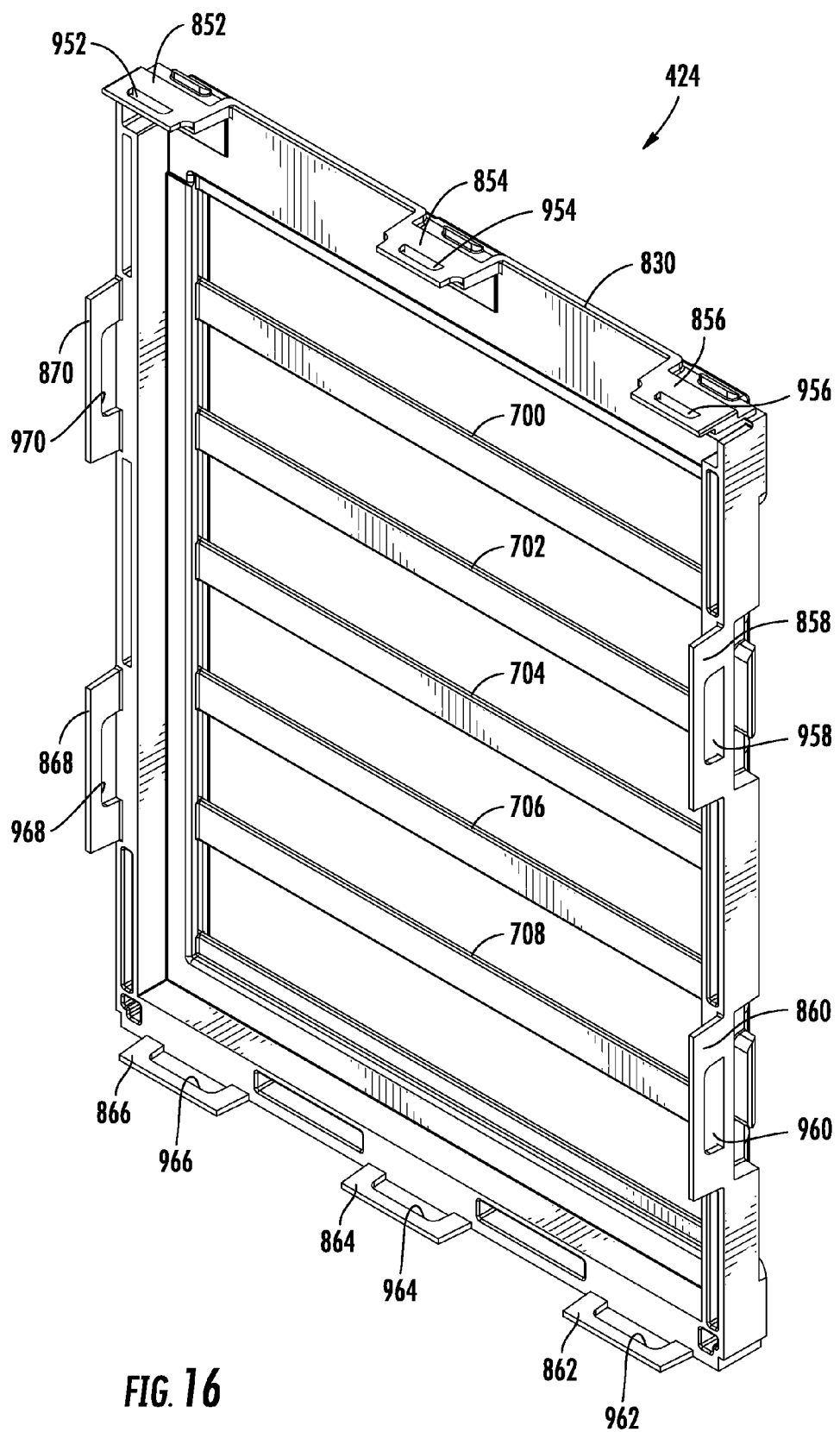
FIG. 16 is an isometric view of another frame member utilized in the battery module of FIG. 19.

Referring to FIGS. 12 and 16, the frame member 424 has an identical structure as the frame member 422. Accordingly, only a portion of the components of the frame member 424 will be discussed below. In particular, the frame member 424 includes a rectangular ring-shaped portion or body 830 and tabs 852, 854, 856, 858, 860, 862, 864, 866, 868, 870. The tabs 852, 854, 856, 858, 860, 862, 864, 866, 868, 870 have apertures 952, 954, 956, 958, 960, 962, 964, 966, 968, 970, respectively, extending therethrough.

Figure 17:
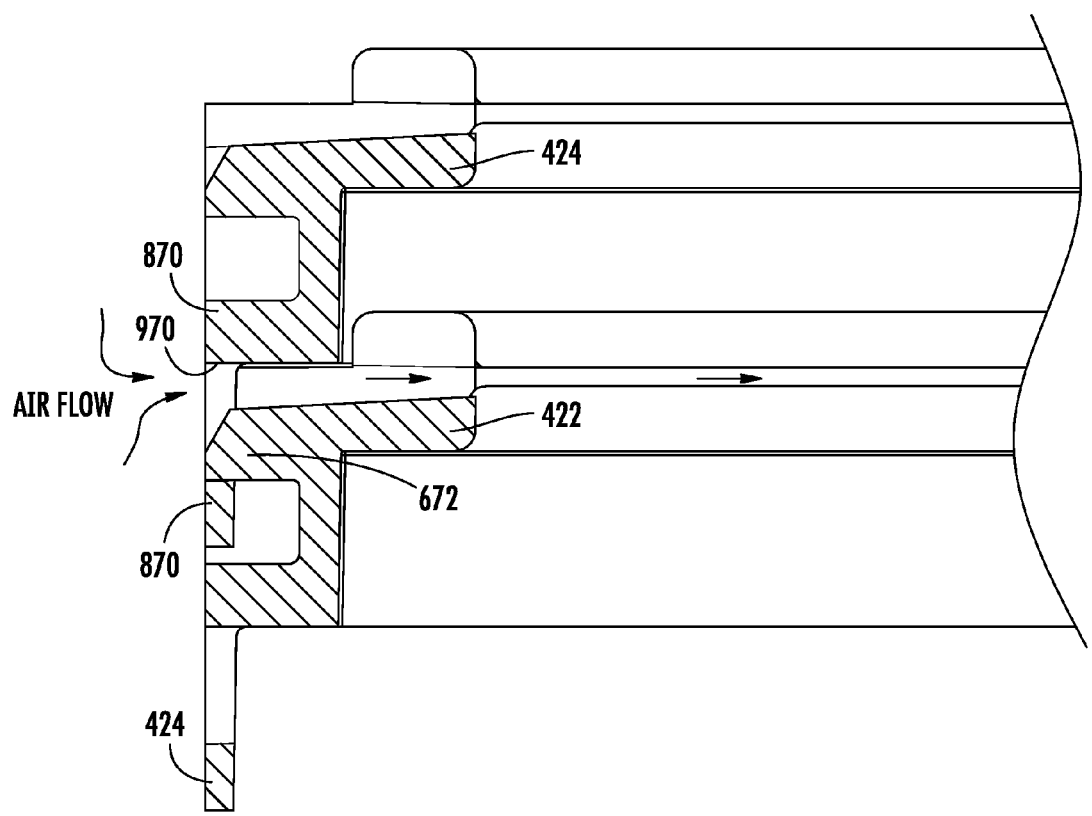
FIG. 17 is an enlarged cross-sectional view of a portion of the frame members of FIGS. 12 and 16, respectively, when the frame members are coupled together.

Referring to FIGS. 15, 16 and 17, an explanation of how portions of the frame members 422, 424 are coupled together will be provided before explaining the coupling together of the frame members 422, 424 in their entirety. As shown, the frame member 424 has a tab 870 with an aperture 970 disposed therethrough. The coupling member 672 of the frame member 422 is configured to be received in the aperture 970 of the frame member 424 to obtain a snap-fit engagement between the frame members 422, 424.

Figure 11:
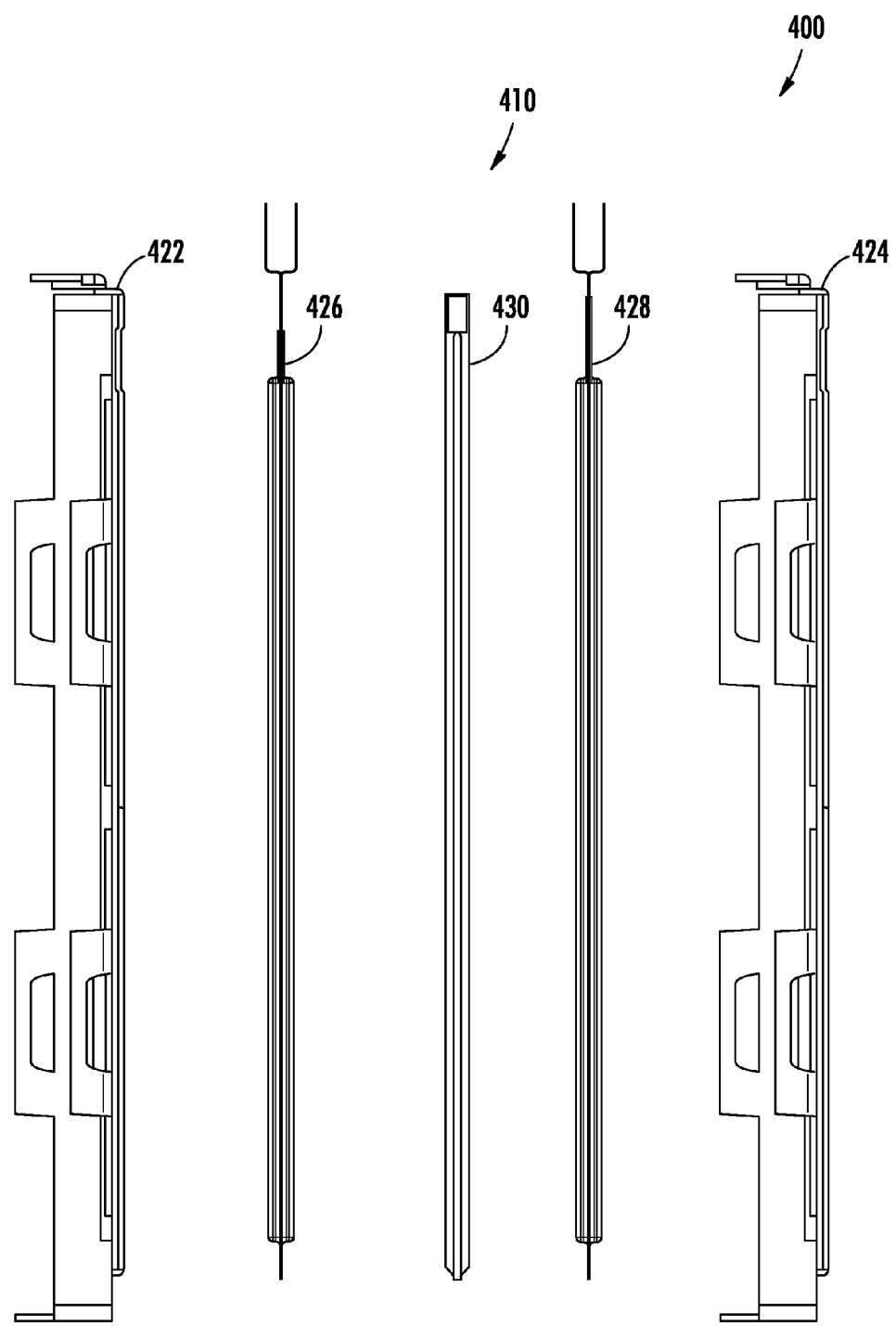
FIG. 11 is an exploded view of a portion of the battery module of FIG. 10.

Referring to FIGS. 11, 12 and 16, the battery cell assembly 410 is coupled together by disposing the battery cells 426, 428 and the compressible spacer 430 between the frame members 422, 424, and then positioning the frame members 422, 424 adjacent to one another such that the tabs 852-870 of the frame member 424 engage the coupling members 652-672, respectively, of the frame member 424 to fixedly hold the frame members 422, 424 together.

Referring to FIG. 11, in an exemplary embodiment the battery cells 426, 428 are lithium-ion pouch-type battery cells. Of course, other types of battery cells known to those skilled in the art could be utilized.

Further, the compressible spacer 430 is configured to bias the battery cells 426, 428 away from the spacer 430 such that the battery cells 426, 428 are firmly held between the frame members 422, 424.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

We claim:

1. A battery cell assembly, comprising:
a first frame member having a first rectangular ring-shaped body and a first plurality of tabs extending away from a first peripheral edge of the first rectangular ring-shaped body, each tab of the first plurality of tabs having a first tab portion, the first tab portion extending in a first direction from the first rectangular ring-shaped body and being substantially perpendicular to the first rectangular ring-shaped body, each tab of the first plurality of tabs further having a first coupling feature at a distal end of the first tab portion that extends substantially perpendicular to the first tab portion and toward an inner open region defined by the first rectangular ring-shaped body; the first peripheral edge further having a first plurality of slots extending into the first peripheral edge, each slot of the first plurality of slots being disposed directly adjacent to a respective tab of the first plurality of tabs;

a second frame member being directly coupled to the first frame member, the second frame member having a second rectangular ring-shaped body and a second plurality of tabs extending away from a second peripheral edge of the second rectangular ring-shaped body, each tab of the second plurality of tabs having a second tab portion, the second tab portion extending in the first direction from the second rectangular ring-shaped body and being substantially perpendicular to the second rectangular ring-shaped body, each tab of the second plurality of tabs further having a second coupling feature at a distal end of the second tab portion that extends substantially perpendicular to the second tab portion and toward an inner open region defined by the second rectangular ring-shaped body; the second peripheral edge further having a second plurality of slots extending into a second peripheral edge, each slot of the second plurality of slots being disposed directly adjacent to a respective tab of the second plurality of tabs;

a first slot of the second plurality of slots having a depth in a second direction from the second peripheral edge toward an inner open region of the second rectangular ring-shaped body that is greater than a length of an engaging surface of a first coupling feature of a first tab of the first plurality of tabs such that an open space is defined in the second direction between an end of the engaging surface of the first coupling feature of the first tab of the first plurality of tabs and the second rectangular ring-shared body when the first coupling feature of the first tab of the first plurality of tabs is disposed in the first slot of the second plurality of slots and is coupled to the second rectangular ring-shaped body; the engaging surface of the first coupling feature of the first tab of the first plurality of tabs directly contacting the second rectangular ring-shaped body; and a battery cell being disposed between the first and second frame members when the first and second frame members are coupled together.

2. The battery cell assembly of claim 1, wherein the battery cell is a lithium-ion pouch type battery cell.

3. The battery cell assembly of claim 1, wherein the first frame member has an identical structure as the second frame member.

4. The battery cell assembly of claim 1, wherein each first tab portion of each tab of the first plurality of tabs is configured to extend over a portion of the second peripheral edge of the second frame member, and the first coupling feature of the each tab is configured to extend into the respective slot of the second frame member.

5. The battery cell assembly of claim 1, wherein a tab of the first plurality of tabs directly communicates with a slot of the first plurality of slots.

6. A battery cell assembly, comprising:
a first frame member having a first rectangular ring-shaped body with first, second, third, and fourth body portions, the first and second body portions being substantially parallel to one another, the third and fourth body portions being substantially parallel to one another and substantially perpendicular to the first and second body portions;

the first body portion having first and second tabs extending away from a first peripheral edge of the first body portion, the first and second tabs being separated from one another and having a gap therebetween;

the third body portion having third and fourth tabs extending away from a first peripheral edge of the third body portion, the third and fourth tabs being separated from one another and having a gap therebetween;

the first tab having a first tab portion extending in a first direction from the rectangular ring-shaped body and being substantially perpendicular to the rectangular ring-shaped body, the first tab further having a first coupling feature at a distal end of the first tab portion that extends substantially perpendicular to the first tab portion in a second direction and toward an inner open region defined by the rectangular ring-shaped body;

a second frame member being directly coupled to the first frame member, the second frame member having a second rectangular ring-shaped body and first, second, third, and fourth tabs extending away from a second peripheral edge of the second rectangular ring-shaped body, the second rectangular ring-shaped body further having first, second, third, and fourth slots extending into the second peripheral edge of the second frame member directly adjacent to the first, second, third, and fourth tabs, respectively, of the second frame member, the first slot having a depth in the second direction greater than a length of an engaging surface of the first coupling feature of the first tab of the first body portion in the second direction such that an open space is defined in the second direction between an end of the engaging surface of the first coupling feature of the first tab of the first body portion and the second rectangular ring-shaped body when the first coupling feature of the first tab of the first body portion is disposed in the first slot and is coupled to the second rectangular ring-shaped body, the engaging surface of the first coupling feature of the first tab directly contacting the second rectangular ring-shaped body; and a battery cell being disposed between the first and second frame members when the first and second frame members are coupled together.

7. The battery cell assembly of claim 6, wherein the third tab having a second tab portion extending in the first direction from the first rectangular ring-shaped body and being substantially perpendicular to the first rectangular ring-shaped body, the third tab further having a second coupling feature at a distal end of the second tab portion that extends substantially perpendicular to the second tab portion and toward the inner open region defined by the first rectangular ring-shaped body.

8. The battery cell assembly of claim 6, wherein a cross-sectional plane extending through the second frame member passes through the first slot of the second frame member and the first tab of the second frame member.

9. The battery cell assembly of claim 6, wherein the first slot of the second frame member directly communicates with the first tab of the second frame member.

10. A battery cell assembly, comprising:
a first frame member having a first rectangular ring-shaped body and a first plurality of tabs extending away from a first peripheral edge of the first rectangular ring-shaped body, each tab of the first plurality of tabs having a first tab portion, the first tab portion extending in a first direction from the first rectangular ring-shaped body and being substantially perpendicular to the first rectangular ring-shaped body, each tab of the first plurality of tabs further having a first coupling feature at a distal end of the first tab portion that extends substantially perpendicular to the first tab portion and toward an inner open region defined by the first rectangular ring-shaped body; the first peripheral edge further having a first plurality of slots extending into the first peripheral edge, each slot of the first plurality of slots being disposed adjacent to a respective tab of the first plurality of tabs such that a cross-sectional plane extending through the first frame member passes through a first tab of the first plurality of tabs and a first slot of the first plurality of slots disposed adjacent to the first tab of the first plurality of tabs;

a second frame member being directly coupled to the first frame member, the second frame member having a second rectangular ring-shaped body and a second plurality of tabs extending away from a second peripheral edge of the second rectangular ring-shaped body, each tab of the second plurality of tabs having a second tab portion, the second tab portion extending in the first direction from the second rectangular ring-shaped body and being substantially perpendicular to the second rectangular ring-shaped body, each tab of the second plurality of tabs further having a second coupling feature at a distal end of the second tab portion that extends substantially perpendicular to the second tab portion and toward an inner open region defined by the second rectangular ring-shaped body; the second peripheral edge further having a second plurality of slots extending into a second peripheral edge, each slot of the second plurality of slots being disposed adjacent to a respective tab of the second plurality of tabs such that the cross-sectional plane further extending through the second frame member passes through a first tab of the second plurality of tabs and a first slot of the second plurality of slots disposed adjacent to the first tab of the second plurality of tabs, the first coupling feature of the first tab of the first plurality of tabs of the first frame member being configured to engage the first slot of the second plurality of slots of the second frame member;

a first slot of the second plurality of slots having a depth in a second direction from the second peripheral edge toward the inner open region of the second rectangular ring-shaped body that is greater than a length of an engaging surface of a first coupling feature of a first tab of the first plurality of tabs such that an open space is defined in the second direction between an end of the engaging surface of the first coupling feature of the first tab of the first plurality of tabs and the second rectangular ring-shaped body when the first coupling feature of the first tab of the first plurality of tabs is disposed in the first slot of the second plurality of slots and is coupled to the second rectangular ring-shaped body; the engaging surface of the first coupling feature of the first tab of the first plurality of tabs directly contacting the second rectangular ring-shaped body; and a battery cell being disposed between the first and second frame members when the first and second frame members are coupled together.

* * * * *